Patented Apr. 21, 1936

2,038,484

UNITED STATES PATENT OFFICE 2,038,484

NEW URIC ACID-DISSOLVING REMEDIES AND A PROCESS FOR THEIR PRODUCTION

Jon Gaathaug, Oslo, Norway

No Drawing. Application June 2, 1934, Serial No. 728,788. In Norway June 29, 1933

8 Claims. (Cl. 260—144)

The present invention relates to new uric acid-dissolving remedies and to a process for their production.

By the process according to the invention, compounds hitherto unknown of nitric acid with trihalogen acetic aldehyde, are formed. These new compounds have proved to possess very valuable properties as medicaments, as they have a dissolving effect on uric acid, so that they can advantageously be used as remedies for gout or as a constituent of such remedies. A compound which is produced from chloral or chloral hydrate and nitric acid has proved to produce especially favourable effects. Secondary actions of objectionable nature have not been observed.

The structural formula of these new compounds is as far as the inventor has been able to ascertain:

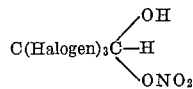

The structural formula of the chlorine compound (chloral nitrate), is—

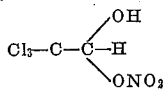

The compounds cannot conveniently be isolated in pure form because they decompose at ordinary temperature with the development of nitrous fumes. For using the compounds as uric acid-dissolving remedies, however they may be used in dissolved condition.

In the dissolved condition the compounds are stable.

The manufacture of the said compounds will be described in the following in connection with chloral nitrate. As it will be understood, the other halogen compounds, for instance bromal nitrate, can be produced in similar way.

The process consists simply in that nitric acid is caused to act upon chloral under such conditions of temperature and concentration that no oxidation of the chloral, for instance to trichlor acetic acid, takes place, but so that the nitric acid forms an addition-compound with the chloral. It is known that the trichlor-acetic acid can be produced by oxidation of chloral with fuming nitric acid. This reaction takes place slowly in the cold, but by comparatively slight heating the oxidation takes place instantaneously. Under these circumstances it was very surprising that it was possible, by only changing the condition of concentration and temperature, to produce an entirely new addition-compound without any formation of trichlor acetic acid. This is achieved by employment of nitric acid not in the form of fuming nitric acid, but in the form of dilute acid. For instance 65 per cent acid may be employed, but preferably a solution containing from about 20 per cent to about 30 per cent $HNO_3$ is employed. For the production of the new compounds, it is—as already stated—also necessary to regulate the temperature, as the nitric acid must be brought to reaction at comparatively low temperatures, preferably not exceeding 20° C. The best results are obtained when the reactions take place at from about 10° to about 20° or 25° C. The temperature which ought to be employed depends partly upon the nitric acid concentration, higher concentrations of acid requiring lower temperatures.

The simplest procedure consists in gradually adding chloral hydrate to a 25% cooled nitric acid solution.

The chloral hydrate is added in an amount which is chemically equivalent to the nitric acid content of the solution.

The obtained solution can, after having been allowed to stand for some days at ordinary temperature, be used as a uric acid dissolving remedy, alone or together with other suitable substances, for instance glycerine.

I claim:—

1. A process for the production of uric acid dissolving remedies which comprises reacting a trihalogen acetic aldehyde with nitric acid which contains about 20 percent to about 65 percent $HNO_3$ at a temperature between about 10° C. and about 25° C.

2. Process as defined in claim 1 in which the trihalogen acetic aldehyde and the nitric acid are mixed for reaction in chemically equivalent amounts.

3. A process for the production of uric acid dissolving remedies which comprises reacting chloral with nitric acid which contains about 20 percent to about 65 percent $HNO_3$ at a temperature between about 10° C. and about 25° C.

4. Process as defined in claim 3 in which the chloral hydrate and the nitric acid are mixed for reaction in chemically equivalent amounts.

5. A process for the production of uric acid dissolving remedies, which comprises reacting chloral with nitric acid which contains from about 20 percent to about 30 percent HNO₃ at a temperature between about 10° C. and about 25° C.

6. Process as defined in claim 5 in which the chloral hydrate and the nitric acid are mixed for reaction in chemically equivalent amounts.

7. As a new product, a compound of the formula

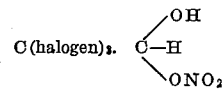

8. As a new product, a compound of the formula

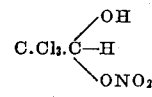

JON GAATHAUG.